US012746965B2

(12) United States Patent
An

(10) Patent No.: US 12,746,965 B2
(45) Date of Patent: Sep. 29, 2026

(54) STEERING CONTROL DEVICE

(71) Applicant: HL MANDO CORPORATION, Pyeongtaek-si (KR)

(72) Inventor: Younggyu An, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 649 days.

(21) Appl. No.: 18/109,405

(22) Filed: Feb. 14, 2023

(65) Prior Publication Data

US 2023/0406402 A1 Dec. 21, 2023

(30) Foreign Application Priority Data

Jun. 21, 2022 (KR) ........................ 10-2022-0075399

(51) Int. Cl.

*B62D 5/04* (2006.01)
*B62D 7/18* (2006.01)
*H02K 41/03* (2006.01)

(52) U.S. Cl.

CPC ........... *B62D 5/0418* (2013.01); *B62D 5/046* (2013.01); *B62D 7/18* (2013.01); *H02K 41/031* (2013.01)

(58) Field of Classification Search

CPC ........ B62D 5/0418; B62D 5/046; B62D 7/18; H02K 41/031; H02K 11/215; H02P 6/16

See application file for complete search history.

(56) References Cited

U.S. PATENT DOCUMENTS 5,924,518 A * 7/1999 D'Onofrio ........... H02K 41/031 180/443

FOREIGN PATENT DOCUMENTS

| | | | | |
|---|---|---|---|---|
| CN | 108146423 A | * | 6/2018 | ............ B60W 10/22 |
| KR | 20130133327 A | * | 12/2013 | ........... B62D 5/0424 |
| KR | 10-2019-0045466 A | | 5/2019 | |

OTHER PUBLICATIONS

Espace translation of CN 108146423 A (Year: 2018).*
Espace translation of KR 20130133327 A (Year: 2013).*

* cited by examiner

*Primary Examiner* — Vivek D Koppikar
*Assistant Examiner* — Scott Lawrence Strickler
(74) *Attorney, Agent, or Firm* — Hauptman Ham, LLP

(57) ABSTRACT

The present disclosure relates to a steering control device capable of controlling steering of a wheel using a linear motor. A steering control device includes a coupling part extending from a wheel and a first linear motor LM1 coupled to the coupling part, and the first linear motor LM1 includes a first shaft SF1 which is movable and a first joint part JT1 having one side rotatably coupled to the first shaft SF1 and another side rotatably coupled to the coupling part.

20 Claims, 13 Drawing Sheets

(b)

(a)

STEERING CONTROL DEVICE

CROSS-REFERENCE TO RELATED APPLICATIONS

This application claims the benefit of Korean Patent Application No. 10-2022-0075399 filed on Jun. 21, 2022, in the Korean Intellectual Property Office, the entire disclosure of which is incorporated herein by reference for all purposes.

BACKGROUND

1. Field of the Invention

One or more example embodiments relate to a steering control device, and more particularly, to a steering control device capable of controlling steering of a wheel using a linear motor.

2. Description of the Related Art

A steering control device of a vehicle is a device capable of controlling a driving direction of the vehicle at the will of a driver, and may include a steering wheel and a steering shaft and deliver the driver's steering force to a gear device.

SUMMARY

Example embodiments provide a steering control device capable of controlling steering of a wheel using a linear motor.

According to an aspect, there is provided a steering control device including a coupling part 301 extending from a wheel W1 and a first linear motor LM1 coupled to the coupling part 301, and the first linear motor LM1 includes a first shaft SF1 which is movable and a first joint part JT1 having one side rotatably coupled to the first shaft SF1 and another side rotatably coupled to the coupling part 301.

The coupling part may include a protrusion PT1 attached to a steering knuckle SN1 of the wheel and a knuckle arm NA1 protruding from the protrusion and rotatably coupled to the first joint part JT1 of the first linear motor LM1.

The first linear motor LM1 may further include at least one driving unit DU1 configured to drive the first shaft SF1.

The at lease one driving unit may include a coil.

The first shaft SF1 may include a yoke 800 including one side rotatably connected to the first joint part JT1 and a permanent magnet 600 disposed on the yoke 800.

The permanent magnet 600 may be disposed on at least one of one surface and another surface of the yoke 800.

The permanent magnet 600 may surround the yoke 800.

The steering control device may further include at least one control unit ECU1 configured to control the at least one driving unit of the first linear motor LM1.

The at least one driving unit may be disposed on one surface of the first shaft SF1.

The at least one driving unit may include a plurality of driving units, and the plurality of driving units may be disposed on one surface and another surface of the first shaft SF1, respectively, to face each other with the first shaft SF1 disposed between the plurality of driving units.

The at least one control unit and the at least one driving unit of the first linear motor LM1 may be connected through a wire 201.

The steering control device may further include a second linear motor LM3 connected to the coupling part, and the second linear motor LM3 may include a second shaft SF3 which is movable and a second joint part JT3 having one side rotatably coupled to the second shaft SF3 and another side rotatably coupled to the coupling part.

The first joint part JT1 and the second joint part JT3 may be rotatably coupled to the coupling part through one common coupling shaft.

The steering control device may further include a strut SR1 coupled to a groove of the protrusion.

The coupling part may be coupled to a lower side of the strut to overlap the wheel.

The coupling part may be coupled to an upper side of the strut to be positioned higher than the wheel.

The protrusion of the coupling part may be coupled to a lower side of the strut to overlap the wheel, and the knuckle arm of the coupling part may be coupled to an upper side of the strut to be positioned higher than the wheel.

According to another aspect, there is provided a steering control device including a coupling part extending from a wheel and at least one linear motor coupled to the coupling part, and the linear motor includes a shaft which is movable, and a joint part having one side rotatably coupled to the shaft and another side rotatably coupled to the coupling part.

The linear motor may include at least one driving unit configured to drive the shaft.

The steering control device may further include at least one control unit configured to control the at least one driving unit of the linear motor.

The steering control device according to example embodiments may provide the following effects.

First, since the linear motor is coupled to the wheel and controls steering of the wheel, a reducer is not required. Accordingly, it is possible to reduce the number of parts so that the manufacturing cost of the steering device may be reduced.

Second, as described above, since the speed reducer is not required, it is possible to improve the efficiency of the steering control device and increase a steering response.

Third, it is possible to apply a variety of steering feel through the control of the linear motor, and it is also possible to precisely control the steering angle of the wheel.

Fourth, since at least two or more linear motors may be provided per one wheel, a dual structure is possible.

Fifth, since devices required for steering control (e.g., a knuckle arm, a linear motor, etc.) are disposed on the outside of the vehicle, a space for a battery of the vehicle and a space for an indoor leg room may be sufficiently secured.

Sixth, it is possible to reduce the size of the linear motor by increasing the length of the coupling part to reduce the load (or driving force) of the linear motor required for steering the wheel.

DETAILED DESCRIPTION

Figure 1:
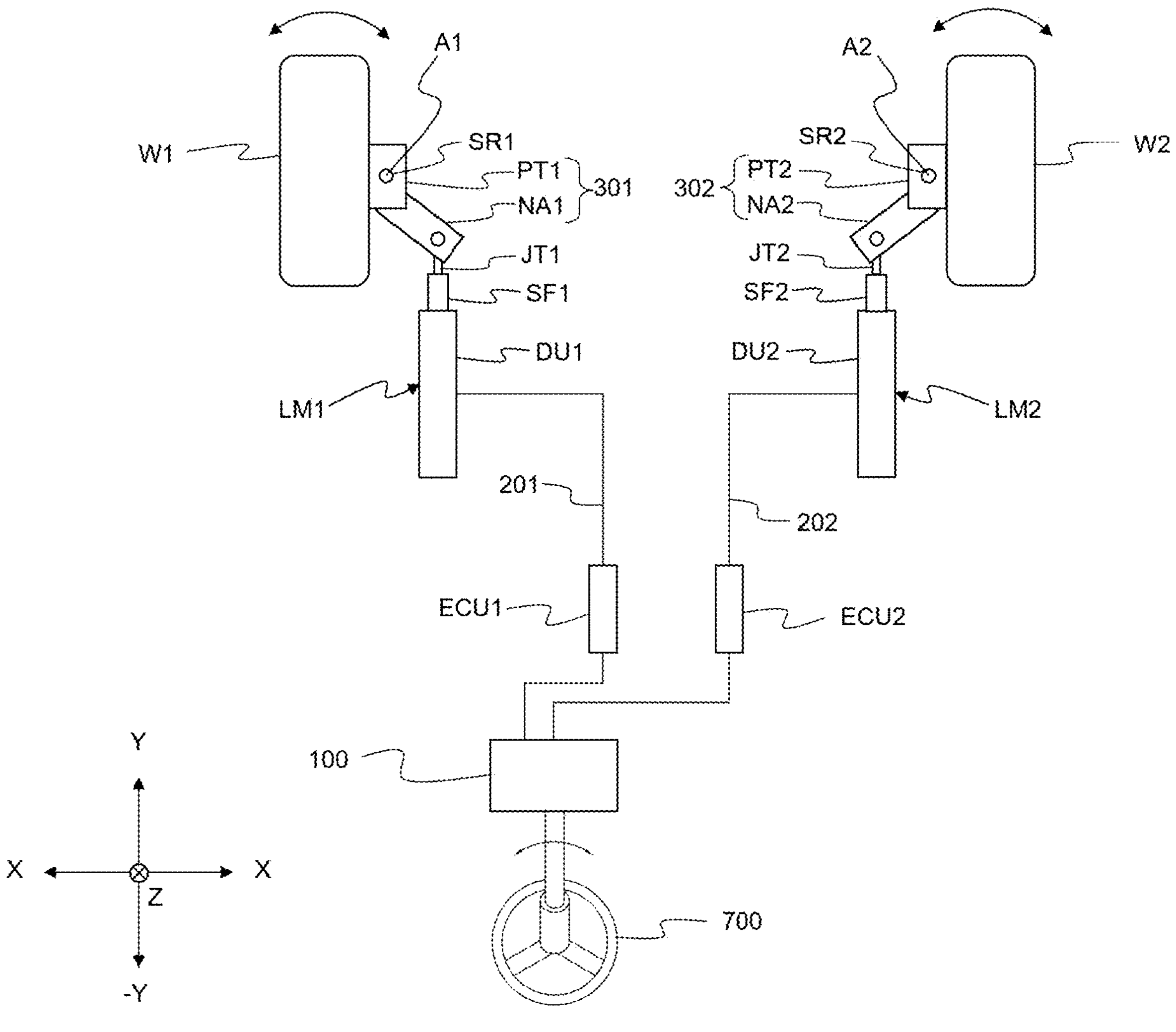
FIG. 1 is a diagram illustrating a steering control device according to an example embodiment.

Advantages and features of the present disclosure and a method of achieving the same should become clear with example embodiments described in detail below with reference to the accompanying drawings. However, the present disclosure is not limited to the example embodiments disclosed below and may be realized in various other forms. The present example embodiments make the disclosure complete and are provided to completely inform one of ordinary skill in the art to which the present disclosure pertains of the scope of the disclosure. The present disclosure is defined only by the scope of the claims. Accordingly, in some example embodiments, well-known process steps, well-known device structures, and well-known techniques have not been specifically described in order to avoid obscuring the present disclosure. Like reference numerals refer to like elements throughout the specification.

In order to clearly express various layers and regions in the drawings, the thicknesses are expressed to be enlarged. Throughout the specification, like reference numerals are assigned to similar parts.

In this specification, terms such as first, second, third, and the like may be used to describe various components, but these components are not limited by the terms. The above terms are used for the purpose of distinguishing one component from other components. For example, a first component may be referred to as a second or third component, and similarly, the second or third component may be alternately named without departing from the scope of the present disclosure.

Unless otherwise defined, all terms including technical and scientific terms used herein have the same meaning as commonly understood by one of ordinary skill in the art to which the present disclosure pertains. Terms, such as those defined in commonly used dictionaries, are not to be construed in an idealized or excessively formal meanings unless the terms are clearly defined in the present disclosure.

Hereinafter, a steering control device according to the present disclosure will be described in detail with reference to FIG. 1 to FIG. 14.

FIG. 1 is a diagram illustrating a steering control device according to an example embodiment.

A steering control device according to an example embodiment, as shown in FIG. 1, may include a steering wheel 700, a reaction force device 100, a first electronic control unit ECU1, a second electronic control unit ECU2, a first linear motor LM1, a second linear motor LM2, a first coupling part 301, and a second coupling part 302.

The reaction force device 100 may receive a control signal (or referred to as a command current) from at least one electronic control unit (e.g., at least one of ECU1 and ECU2) to apply a reaction force to the steering wheel 700. Specifically, the reaction force device 100 may receive a command current from the electronic control unit, generate a reaction force torque by driving at a rotation speed indicated by the command current, and transmit the reaction force torque to the steering wheel 700 through the steering gear.

At least one electronic control unit (e.g., at least one of ECU1 and ECU2) may receive steering information from a steering input actuator (e.g., steering wheel 700 and reaction force device 100) to calculate a control value, and output an electrical signal (e.g., a steering control signal) indicating the control value to a steering output actuator (e.g., the first linear motor LM1 and the second linear motor LM2). Here, the steering information may refer to information including at least one of a steering angle and a driver's torque.

In addition, the at least one electronic control unit (e.g., at least one of ECU1 and ECU2) may receive power information actually output from the steering output actuator (e.g., the first linear motor LM1 and the second linear motor LM2) as a feedback to calculate a control value, and provide a feeling of steering (e.g., steering feeling) by outputting the electrical signal indicating the control value to the steering input actuator (e.g., the steering wheel 700 and the reaction force device 100).

Meanwhile, the first linear motor LM1 may be connected to the first electronic control unit ECU1 through, for example, the first wire 201. The above-described steering control signal from the first electronic control unit ECU1 may be provided to the first linear motor LM1 through the first wire 201. In addition, the second linear motor LM2 may be connected to the second electronic control unit ECU2 through, for example, the second wire 202. The steering control signal from the above-described second electronic control unit ECU2 may be provided to the second linear motor LM2 through the second wire 202. As described above, the steering of a first wheel W1 and a second wheel W2 of the present disclosure may be controlled by, for example, a Steer-by-Wire method.

The first wheel W1 described above may be, for example, a front left wheel of a vehicle, and the second wheel W2 may be, for example, a front right wheel of the vehicle.

In addition, a rear left wheel and a rear right wheel of the vehicle may also be steered through the above-described linear motor, respectively. In this case, four linear motors may be independently coupled to each of the four wheels.

Figure 2:
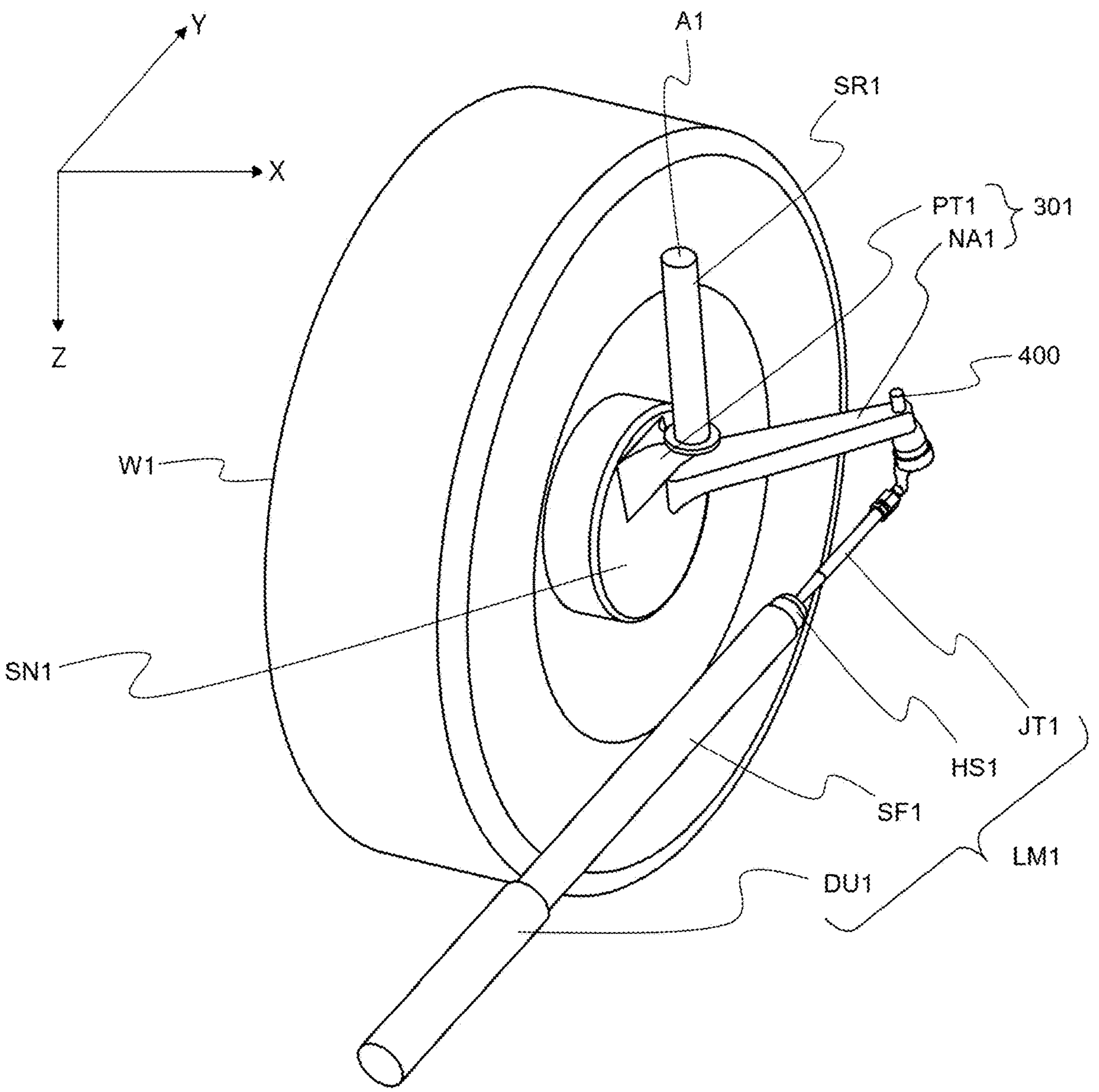
FIG. 2 is a three-dimensional view for illustrating a connection relationship between a first linear motor and a first wheel of FIG. 1.

FIG. 2 is a three-dimensional view for illustrating a connection relationship between the first linear motor LM1 and the first wheel W1 of FIG. 1.

The first linear motor LM1 may be connected to the first wheel W1 through the first coupling part 301. For example, the first coupling part 301 may be coupled to the first steering knuckle SN1 protruding from the inner center of the first wheel W1. The first coupling part 301 may be attached to and fixed to the first steering knuckle SN1 of the first wheel W1. As an example for this, the first coupling part 301 may be formed integrally with the first steering knuckle SN1.

The first coupling part 301 may include, for example, a first protrusion PT1 and a first knuckle arm NA1. Here, the load (or driving force) required for the first linear motor LM1 may be controlled according to the length of the first coupling part 301. For example, as the length of at least one of the first protrusion PT1 and the first knuckle arm NA1 (e.g., the first knuckle arm NA1) increases, the load (or driving force) of the first linear motor LM1 for steering the first wheel W1 may be reduced. When the load of the first linear motor LM1 is reduced, there is an advantage that the size of the first linear motor LM1 can be reduced.

The first protrusion PT1 may be attached to and fixed to the first steering knuckle SN1 of the first wheel W1. As an example for this, the first protrusion PT1 and the first steering knuckle SN1 may be integrally formed. Also, the first knuckle arm NA1 may be attached to and fixed to the first protrusion PT1. As an example for this, the first knuckle arm NA1 and the first protrusion PT1 may be integrally formed.

The first knuckle arm NA1 may protrude from the first protrusion PT1 and may be rotatably coupled to the first linear motor LM1. For example, the first knuckle arm NA1 may be rotatably coupled to a first joint part JT1 of the first linear motor LM1 to be described later.

Meanwhile, the vehicle steering device according to an example embodiment may further include, for example, a first strut SR1 coupled to the first coupling part 301. The first strut SR1 may be inserted into, for example, a groove of the first protrusion PT1. In this case, the first strut SR1 may be fixed to the first protrusion PT1. The first strut SR1 may be fixed to the vehicle body to form a steering axis of the first wheel W1.

Figure 3:
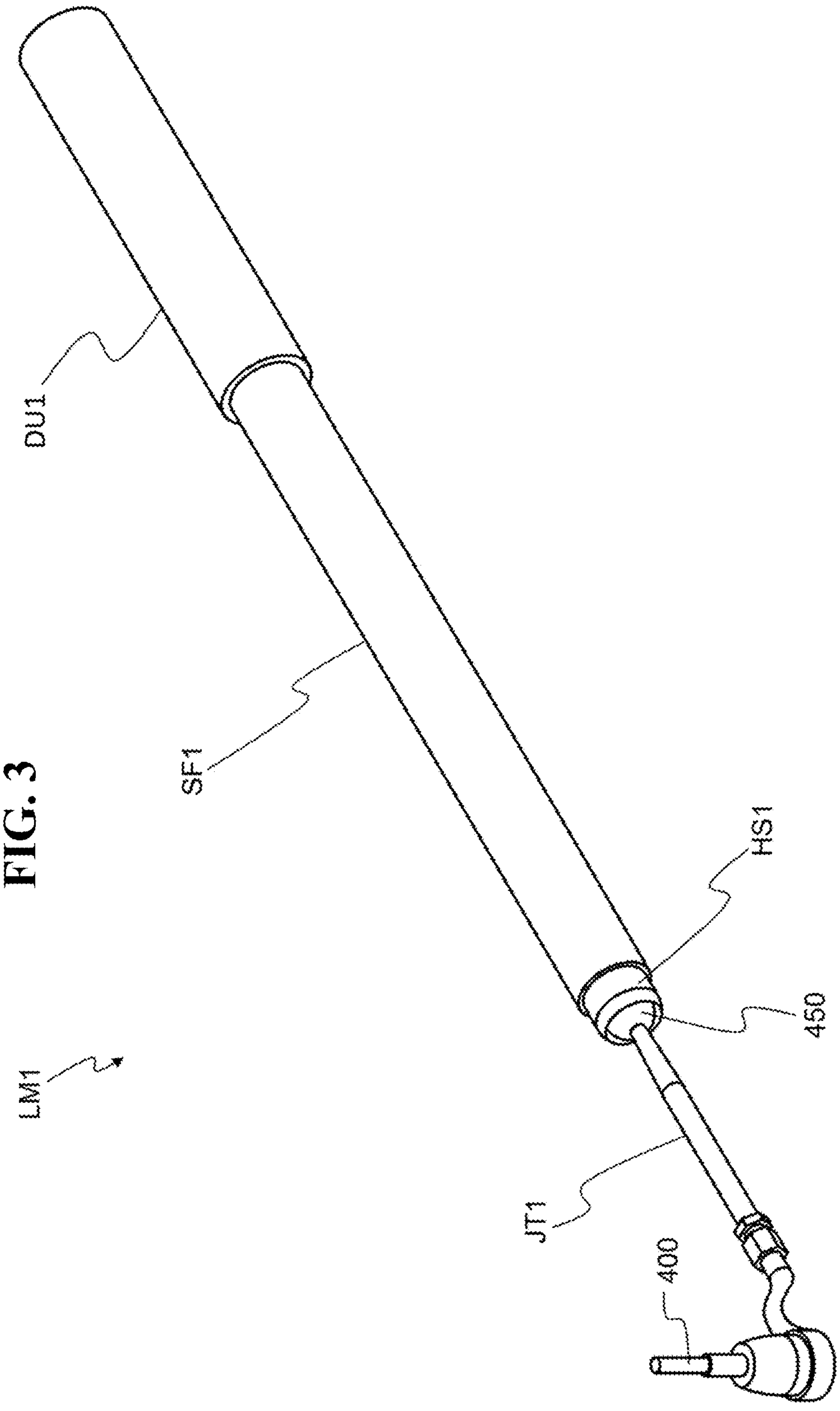
FIG. 3 is a three-dimensional view illustrating the first linear motor of FIG. 2.
Figure 4:
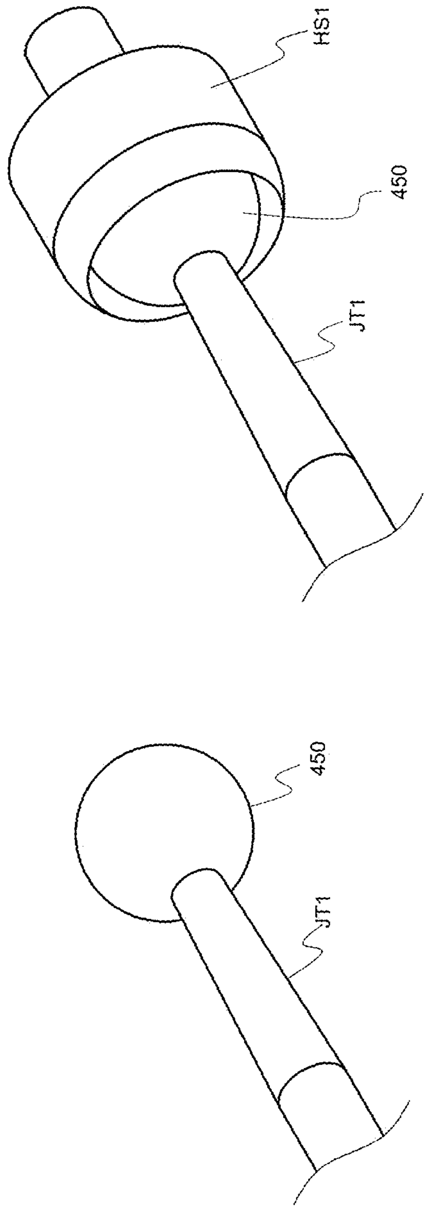
FIG. 4 is a diagram illustrating connection between a first shaft and a first joint part of FIG. 3.

FIG. 3 is a three-dimensional view of the first linear motor LM1 of FIG. 2, and FIG. 4 is a diagram for illustrating the connection between the first shaft SF1 and the first joint part JT1 of FIG. 3.

The first linear motor LM1 may be controlled by, for example, the first electronic control unit ECU1.

The first linear motor LM1 may include a first driving unit DU1, a first shaft SF1, a first housing HS1, and a first joint part JT1, as illustrated in FIG. 3.

The first shaft SF1 may be expandable and contractible. As an example for this, the first shaft SF1 may reciprocate in a linear direction (e.g., Y-axis direction or −Y-axis direction).

The first driving unit DU1 may drive the first shaft SF1. For example, the first driving unit DU1 may control the moving direction, moving distance, and moving speed of the first shaft SF1 according to the first steering control signal from the first electronic control unit ECU1. In other words, since the moving direction, moving distance, and moving speed of the first shaft SF1 may vary according to the control value of the first steering control signal, the first driving unit DU1 may control the moving direction, moving distance, and moving speed of the first shaft SF1 differently according to the magnitude of the control value of the first steering control signal.

The first joint part JT1 may be rotatably coupled to the first shaft SF1. For example, one side of the first joint part JT1 may be rotatably coupled to the first shaft SF1 through the first housing HS1. As a specific example, one end of the first joint part JT1 may have a spherical connection part 450 as shown in FIG. 4, and the connection part 450 may be inserted into the inner groove of the first housing HS1. Accordingly, the first joint part JT1 may freely rotate around the connection part 450. In addition, the first housing HS1 may be coupled to the first shaft SF1. Accordingly, one side of the first joint part JT1 may be rotatably coupled to the first shaft SF1.

In addition, another side of the first joint part JT1 may be rotatably coupled to the first coupling part 301. For example, since the first joint part JT1 may include a first coupling shaft 400 disposed at the other end of the first joint part JT1, the first coupling shaft 400 of the first joint part JT1 may be inserted into the coupling hole of the first knuckle arm NA1. The first coupling shaft 400 may rotate while being inserted into the coupling hole of the first knuckle arm NA1.

The steering direction, steering angle and steering speed (e.g., angular velocity) of the first wheel W1 connected to the first linear motor LM1 may be controlled according to the moving direction, moving distance, and moving speed of the first shaft SF1 provided in the first linear motor LM1.

Figure 5:
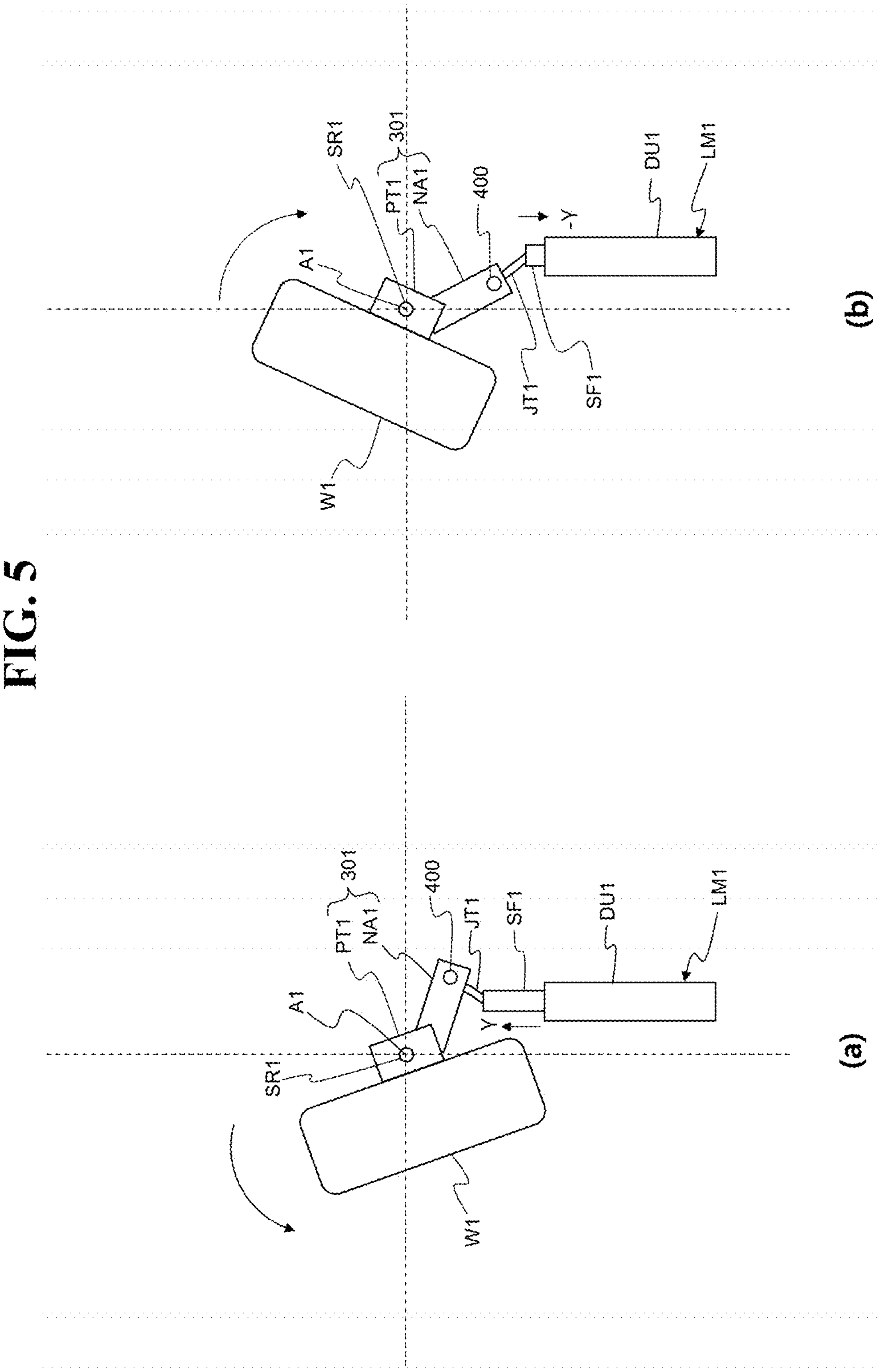
FIG. 5 is a diagram illustrating a steering direction of a first wheel according to driving of the first linear motor of FIG. 1.

FIG. 5 is a diagram for illustrating the steering direction of the first wheel W1 according to the driving of the first linear motor LM1 of FIG. 1.

As an example shown in (a) of FIG. 5, when the first linear motor LM1 is driven so that the first shaft SF1 of the first linear motor LM1 moves along the Y-axis direction (for example, so that the first shaft SF1 is expanded), the first wheel W1 may be steered (or rotated) counterclockwise about the first steering axis A1. On the other hand, as an example shown in (b) of FIG. 5, when the first linear motor LM1 is driven so that the first shaft SF1 of the first linear motor LM1 moves along the −Y axis direction (e.g., so that the first shaft SF1 is contracted), the first wheel W1 may be steered (or rotated) in a clockwise direction about the first steering axis A1.

Meanwhile, as an example shown in FIG. 1, the second linear motor LM2 may be connected to the second wheel W2 through the second coupling part 302. For example, the second coupling part 302 may be coupled to the second steering knuckle protruding from the inner center of the second wheel W2. The second coupling part 302 may be attached to and fixed to the second steering knuckle of the second wheel W2. As an example for this, the second coupling part 302 may be formed integrally with the second steering knuckle.

The second coupling part 302 may include, for example, a second protrusion PT2 and a second knuckle arm NA2. Here, the load (or driving force) required for the second linear motor LM2 may be controlled according to the length of the second coupling part 302. For example, as the length of at least one of the second protrusion PT2 and the second knuckle arm NA2 (e.g., the second knuckle arm NA2) increases, the load (or driving force) of the second linear motor LM2 for steering the second wheel W2 may be reduced. When the load of the second linear motor LM2 is reduced, there is an advantage that the size of the second linear motor LM2 can be reduced.

On the other hand, since the components of the second coupling part 302 are the same as the components of the first coupling part 301 described above, the description of the second protrusion PT2 and the second knuckle arm NA2 of the second coupling part 302 refers to the description of the first protrusion PT1 and the first knuckle arm NA1 of the first coupling part 301, respectively.

The second strut SR2 may be inserted into, for example, a groove of the second protrusion PT2. In this case, the second strut SR2 may be fixed to the second protrusion PT2. The second strut SR2 may be fixed to the vehicle body to form a steering axis of the second wheel W2.

The second linear motor LM2 may include, for example, a second driving unit DU2, a second shaft SF2, a second housing, and a second joint unit JT2. Since the components of the second linear motor LM2 are the same as components of the above-described first linear motor LM1, the description of the second driving unit DU2, the second shaft SF2, the second housing and the second joint part JT2 of the second linear motor LM2 refers to the description of the first driving unit DU1, the first shaft SF1, the first housing HS1, and the first joint part JT1 of the first linear motor LM1 described above, respectively.

The second linear motor LM2 may be controlled by, for example, the second electronic control unit ECU2. As a specific example, the second driving unit DU2 of the second linear motor LM2 may control the moving direction, moving distance and moving speed of the second shaft SF2 according to the second steering control signal from the second electronic control unit ECU2. In other words, since the moving direction, moving distance, and moving speed of the second shaft SF2 may vary according to the control value of the second steering control signal, the second driving unit DU2 may control the moving direction, moving distance, and moving speed of the second shaft SF2 differently according to the magnitude of the control value of the second steering control signal. For example, when the second linear motor LM2 is driven so that the second shaft SF2 of the second linear motor LM2 moves along the Y-axis direction (e.g., so that the second shaft SF2 is expanded), the second wheel W2 may be steered (or rotated) in a clockwise direction about the second steering axis A2. On the other hand, when the second linear motor LM2 is driven so that the second shaft SF2 of the second linear motor LM2 moves along the −Y axis direction (e.g., so that the second shaft SF2 is contracted), the second wheel W2 may be steered (or rotated) in a counterclockwise direction about the second steering axis A2.

Meanwhile, when the first shaft SF1 of the first linear motor LM1 connected to the first wheel W1 is expanded along the Y-axis direction as shown in (a) of FIG. 5, the second shaft SF2 of the second linear motor LM2 connected to the second wheel W2 may be contracted along the −Y axis direction. Accordingly, both the first wheel W1 and the second wheel W2 may steer (or rotate) in the counterclockwise direction.

In addition, when the first shaft SF1 of the first linear motor LM1 connected to the first wheel W1 is contracted along the −Y axis direction as shown in (b) of FIG. 5, the second shaft SF2 of the second linear motor LM2 connected to the second wheel W2 may be expanded along the Y-axis direction. Accordingly, both the first wheel W1 and the second wheel W2 may steer (or rotate) in the clockwise direction.

Figure 6:
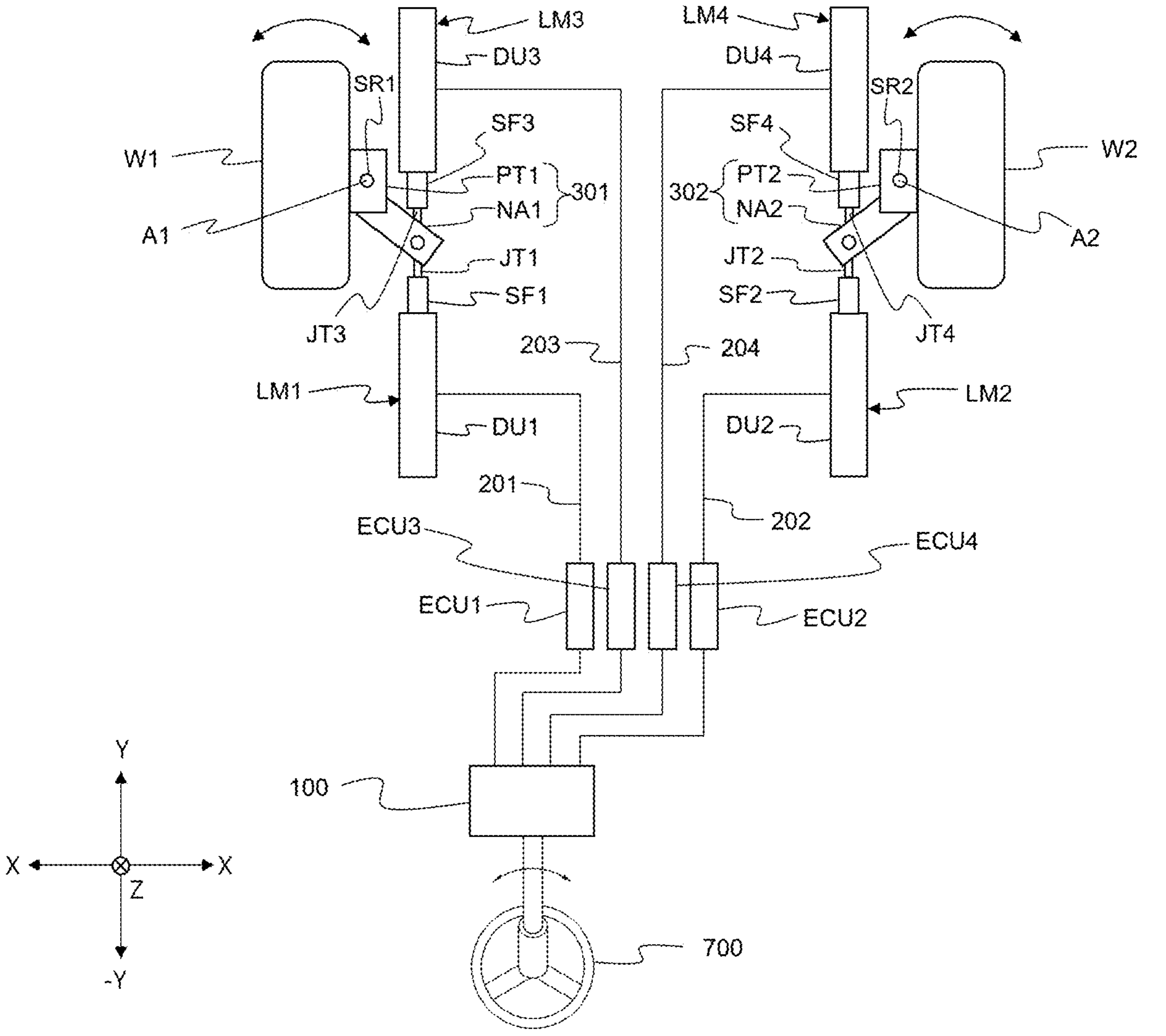
FIG. 6 is a diagram illustrating a steering control device according to another example embodiment.

FIG. 6 is a diagram illustrating a steering control device according to another example embodiment.

The steering control device shown in FIG. 6, for example, may further include a third linear motor LM3, a fourth linear motor LM4, and a third electronic control unit ECU3, and a fourth electronic control unit ECU4 in addition to the components of the steering device of FIG. 1 described above.

The third linear motor LM3 may be connected to the first wheel W1 through the first coupling part 301 described above. For example, the third linear motor LM3 may be rotatably coupled to the first coupling unit 301 together with the first linear motor LM1.

The third linear motor LM3 may be controlled by, for example, the third electronic control unit ECU3. As a specific example, the third driving unit DU3 of the third linear motor LM3 may control the moving direction, moving distance, and moving speed of the third shaft SF3 according to the third steering control signal from the third electronic control unit ECU3. In other words, since the moving direction, moving distance, and moving speed of the third shaft SF3 may vary according to the control value of the third steering control signal, the third driving unit DU3 may control the moving direction, moving distance, and moving speed of the third shaft SF3 differently according to the magnitude of the control value of the third steering control signal. For example, when the third linear motor LM3 is driven so that the third shaft SF3 of the third linear motor LM3 moves along the −Y-axis direction (e.g., so that the third shaft SF3 is expanded), the first wheel W1 may be steered (or rotated) in a clockwise direction about the first steering axis A1. On the other hand, when the third linear motor LM3 is driven so that the third shaft SF3 of the third linear motor LM3 moves along the Y-axis direction (e.g., so that the third shaft SF3 is contracted), the first wheel W1 may be steered (or rotated) in a counterclockwise direction about the first steering axis A1.

When controlling the steering of the first wheel W1, since the first linear motor LM1 and the third linear motor LM3 coupled together to the first wheel W1 may operate simultaneously, the first linear motor LM1 and the third linear motor LM3 may be driven opposite to each other so that the first shaft SF1 and the third shaft SF3 move in the same direction. For example, when the first linear motor LM1 is driven so that the first shaft SF1 moves in the Y-axis direction (e.g., so that the first shaft SF1 is expanded), the third linear motor LM3 may be driven so that the third shaft SF3 moves in the Y-axis direction (e.g., so that the third shaft SF3 is contracted). In a similar manner, when the first linear motor LM1 is driven so that the first shaft SF1 moves in the −Y-axis direction (e.g., so that the first shaft SF1 is contracted), the third linear motor LM3 may be driven so that the third shaft SF3 moves in the −Y-axis direction (e.g., so that the third shaft SF3 is expanded).

As another example embodiment, when controlling the steering of the first wheel W1, only one of the first linear motor LM1 and the third linear motor LM3 coupled together to the first wheel W1 may be driven. In this case, the linear motor being driven may drive its own shaft and the shaft of another linear motor in a non-driven state together. For example, when the first linear motor LM1 is in a driving state and the third linear motor LM3 is set to a non-driven state, the first linear motor LM1 may move the first shaft SF1 and the third shaft SF3 together. Similarly, when the third linear motor LM3 is in the driving state and the first linear motor LM1 is set to the non-driven state, the third linear motor LM3 may move the third shaft SF3 and the first shaft SF1 together.

The fourth linear motor LM4 may be connected to the second wheel W2 through the above-described second coupling part 302. For example, the fourth linear motor LM4 may be rotatably coupled to the second coupling unit 302 together with the second linear motor LM2.

The fourth linear motor LM4 may be controlled by, for example, the fourth electronic control unit ECU4. As a specific example, the fourth driving unit DU4 of the fourth linear motor LM4 may control the moving direction, moving distance, and moving speed of the fourth shaft SF4 according to the fourth steering control signal from the fourth electronic control unit ECU4. In other words, since the moving direction, moving distance, and moving speed of the fourth shaft SF4 may vary according to the control value of the fourth steering control signal, the fourth driving unit DU4 may control the moving direction, moving distance, and moving speed of the fourth shaft SF4 differently according to the magnitude of the control value of the fourth steering control signal. For example, when the fourth linear motor LM4 is driven so that the fourth shaft SF4 of the fourth linear motor LM4 moves along the −Y-axis direction (e.g., so that the fourth shaft SF4 is expanded), the second wheel W2 may be steered (or rotated) in a counterclockwise direction about the second steering axis A2. On the other hand, when the fourth linear motor LM4 is driven so that the fourth shaft SF4 of the fourth linear motor LM4 moves along the Y-axis direction (e.g., so that the fourth shaft SF4 is contracted), the second wheel W2 may be steered (or rotated) in a clockwise direction about the second steering axis A2.

When controlling the steering of the second wheel W2, the second linear motor LM2 and the fourth linear motor LM4 coupled together to the second wheel W2 may operate simultaneously. In this case, the second linear motor LM2 and the fourth linear motor LM4 may be driven opposite to each other so that the second shaft SF2 and the fourth shaft SF4 may move in the same direction. For example, when the second linear motor LM2 is driven so that the second shaft SF2 moves in the Y-axis direction (e.g., so that the second shaft SF2 is expanded), the fourth linear motor LM4 may be driven so that the fourth shaft SF4 moves in the Y-axis direction (e.g., so that the fourth shaft SF4 is contracted). In a similar manner to this, when the second linear motor LM2 is driven so that the second shaft SF2 moves in the −Y-axis direction (e.g., so that the second shaft SF2 is contracted), the fourth linear motor LM4 may be driven so that the fourth shaft SF4 moves in the −Y-axis direction (e.g., the fourth shaft to SF4 is expanded).

As another example embodiment, when controlling the steering of the second wheel W2, only one of the second linear motor LM2 and the fourth linear motor LM4 coupled together to the second wheel W2 may be driven. In this case, the linear motor being driven may drive its own shaft and the shaft of another linear motor in a non-driven state together. For example, when the second linear motor LM2 is in the driving state and the fourth linear motor LM4 is set in the non-driven state, the second linear motor LM2 may move the second shaft SF2 and the fourth shaft SF4 together. Similarly, when the fourth linear motor LM4 is in the driving state and the second linear motor LM2 is set to the non-driven state, the fourth linear motor LM4 may move the fourth shaft SF4 and the second shaft together.

Meanwhile, the third linear motor LM3 may be connected to the third electronic control unit ECU3 through, for example, the third wire 203. The steering control signal from the above-described third electronic control unit ECU3 may be provided to the third linear motor LM3 through the third wire 203. Also, the fourth linear motor LM4 may be connected to the fourth electronic control unit ECU4 through, for example, the fourth wire 204. The steering control signal from the above-described fourth electronic control unit ECU4 may be provided to the fourth linear motor LM4 through the fourth wire 204.

As shown in FIG. 6, the load (or driving force) of each linear motor required for steering of one wheel may be distributed by arranging at least two linear motors per one wheel, and even if an abnormality occurs in any one linear motor, the wheels may be steered through another linear motor (for example, a dual structure is possible).

Figure 7:
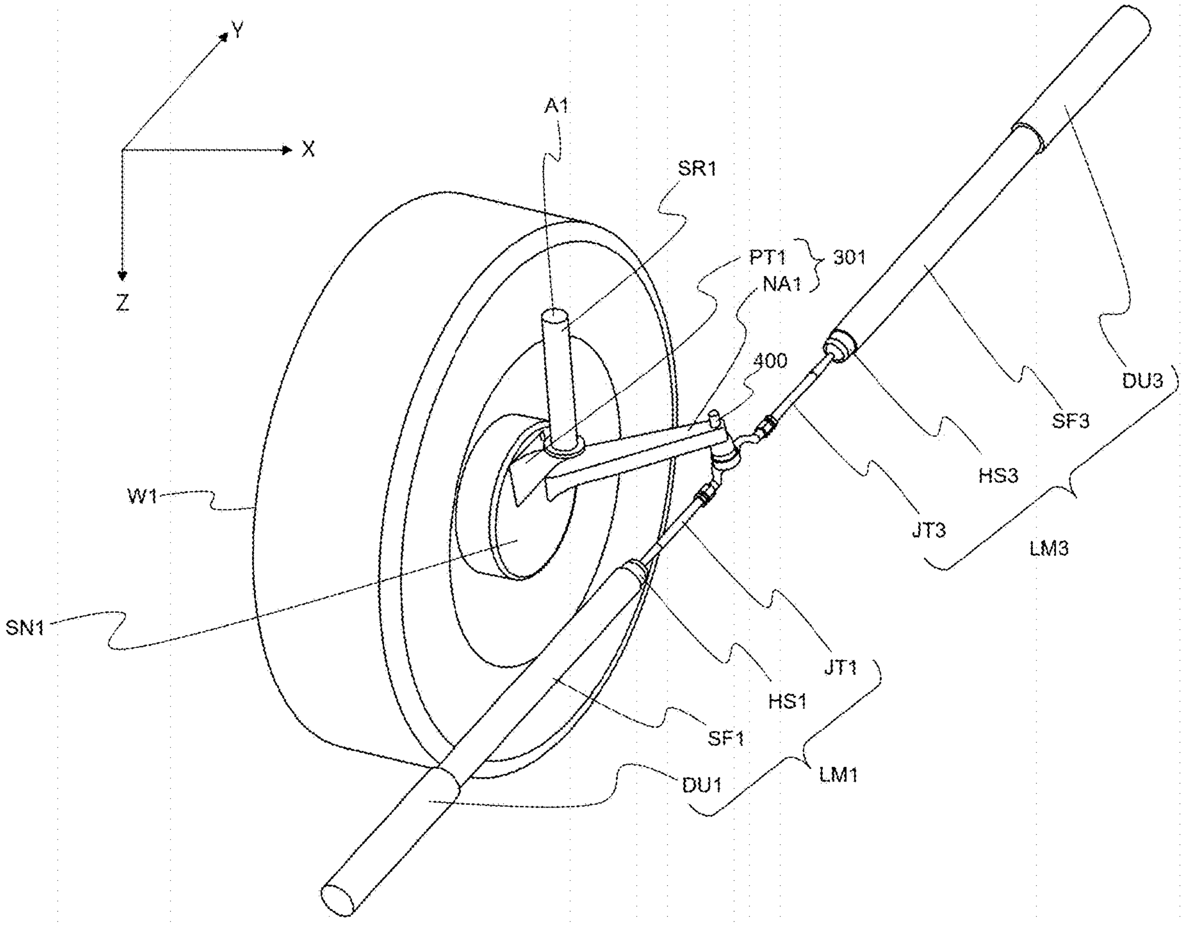
FIG. 7 is a three-dimensional view for illustrating a connection relationship between a first linear motor, a third linear motor, and a first wheel of FIG. 6.

FIG. 7 is a three-dimensional view for illustrating a connection relationship between the first linear motor LM1, the third linear motor LM3, and the first wheel W1 of FIG. 6.

The first linear motor LM1 and the third linear motor LM3 may be connected to the first wheel W1 through the first coupling part 301. For example, the first coupling part 301 may be coupled to the first steering knuckle SN1 protruding from the inner center of the first wheel W1. The first coupling part 301 may be attached to and fixed to the first steering knuckle SN1 of the first wheel W1. As an example for this, the first coupling part 301 may be formed integrally with the first steering knuckle SN1.

The first coupling part 301 may include, for example, the first protrusion PT1 and the first knuckle arm NM. Since the first coupling part 301 of FIG. 7 is the same as the first coupling part 301 of FIG. 1 described above, the description of the first protrusion PT1 and the first knuckle arm NA1 of the first coupling part 301 of FIG. 7 refers to the description of the first protrusion PT1 and the first knuckle arm NA1 of the first coupling part 301 shown in FIG. 1, respectively.

The first strut SR1 may be coupled to the groove of the first protrusion PT1. Since the first strut SR1 of FIG. 7 is the same as the first strut SR1 of FIG. 1 described above, the description of the first strut SR1 of FIG. 7 refers to the description of the first strut SR1 of FIG. 1.

The third linear motor LM3 may be rotatably coupled to the first coupling unit 301 together with the first linear motor LM1. In this case, the third linear motor LM3 and the first linear motor LM1 may include a structure sharing one coupling shaft 400. For example, another end of the third joint part JT3 of the third linear motor LM3 may be connected to the other end of the first joint part JT1 of the above-described first linear motor LM1 to form one connection part, and one coupling shaft 400 may be disposed on the connection part. The coupling shaft 400 of the connection part may be rotatably coupled to the first knuckle arm NA1 of the first coupling part 301. Accordingly, the first linear motor LM1 and the third linear motor LM3 may be rotatably coupled together to the first coupling part 301.

On the other hand, as another example embodiment, the third linear motor LM3 may include a structure in which the other end of the third joint part JT3 of the third linear motor LM3 and the other end of the first joint part JT1 of the above-described first linear motor LM1 overlap in the Z-axis direction in order to be rotatably coupled to the first coupling part 301 together with the first linear motor LM1. To this end, for example, the third linear motor LM3 may be disposed on the first linear motor LM1 in the Z-axis direction. In this case, the coupling shaft of the first joint part JT1 may pass through the other end of the third joint part JT3 to be rotatably coupled to the first coupling part 301. In other words, the third linear motor LM3 may be disposed between the first knuckle arm NA1 and the first linear motor LM1, and the coupling shaft extending from the first joint part JT1 (e.g., the other end of the first joint part JT1) of the first linear motor LM1 may pass through the third joint part JT3 (e.g., the other end of the third joint part JT3) of the third linear motor LM3 to be rotatably coupled to the first knuckle arm NM. Accordingly, the first linear motor LM1 and the third linear motor LM3 may be rotatably coupled together to the first coupling part 301. Meanwhile, reference numeral HS3 in FIG. 7 refers to the third housing HS3 of the third linear motor LM3.

The connection structure between the second linear motor LM2, the fourth linear motor LM4, and the second wheel W2 may be the same as the connection structure between the first linear motor LM1, the third linear motor LM3, and the first wheel W1 of FIG. 7 described above. For example, the second linear motor LM2 and the fourth linear motor LM4 may be connected to the second wheel W2 through the second coupling part 302. For example, the second coupling part 302 may be coupled to the second steering knuckle protruding from the inner center of the second wheel W2. The second coupling part 302 may be fixed and attached to the second steering knuckle of the second wheel W2. As an example for this, the second coupling part 302 may be formed integrally with the second steering knuckle.

The second coupling part 302 may include, for example, a second protrusion PT2 and a second knuckle arm NA2. Since the second coupling part 302 is the same as the first coupling part 301 of FIG. 1 described above, the description of the second protrusion PT2 and the second knuckle arm NA2 of the second coupling part 302 of FIG. 6 refers to the description of the second protrusion PT2 and the second knuckle arm NA2 of the second coupling part 302 shown in FIG. 1, respectively.

The fourth linear motor LM4 may be rotatably coupled to the second coupling part 302 together with the second linear motor LM2. In this case, the fourth linear motor LM4 and the second linear motor LM2 may include a structure sharing one coupling axis. For example, another end of the fourth joint part JT4 of the fourth linear motor LM4 and another end of the second joint part JT2 of the above-described second linear motor LM2 may be connected to form one connection part, and the coupling shaft may be disposed at the connection part thereof. The coupling shaft of the connection part may be rotatably coupled to the second knuckle arm NA2 of the second coupling part 302. Accordingly, the second linear motor LM2 and the fourth linear motor LM4 may be rotatably coupled together to the second coupling part 302.

Meanwhile, as another example embodiment, in order to rotatably couple the fourth linear motor LM4 and the second linear motor LM2 together to the second coupling part 302, the other end of the fourth joint part JT4 of the fourth linear motor LM4 and the other end of the second joint part JT2 of the above-described second linear motor LM2 may overlap in the Z-axis direction. To this end, for example, the fourth linear motor LM4 may be disposed on the second linear motor LM2 in the Z-axis direction. In this case, the coupling shaft of the second joint part JT2 may pass through the other end of the fourth joint part JT4 to be rotatably coupled to the second coupling part 302. In other words, the fourth linear motor LM4 may disposed between the second knuckle arm NA2 and the second linear motor LM2, and the coupling shaft extending from the second joint part JT2 (e.g., the other end of the second joint part JT2) of the second linear motor LM2 may pass through the fourth joint part JT4 (e.g., the other end of the fourth joint part JT4) of the fourth linear motor LM4 to be rotatably coupled to the second knuckle arm NA2. Accordingly, the second linear motor LM2 and the fourth linear motor LM4 may be rotatably coupled together to the second coupling part 302.

Figure 8:
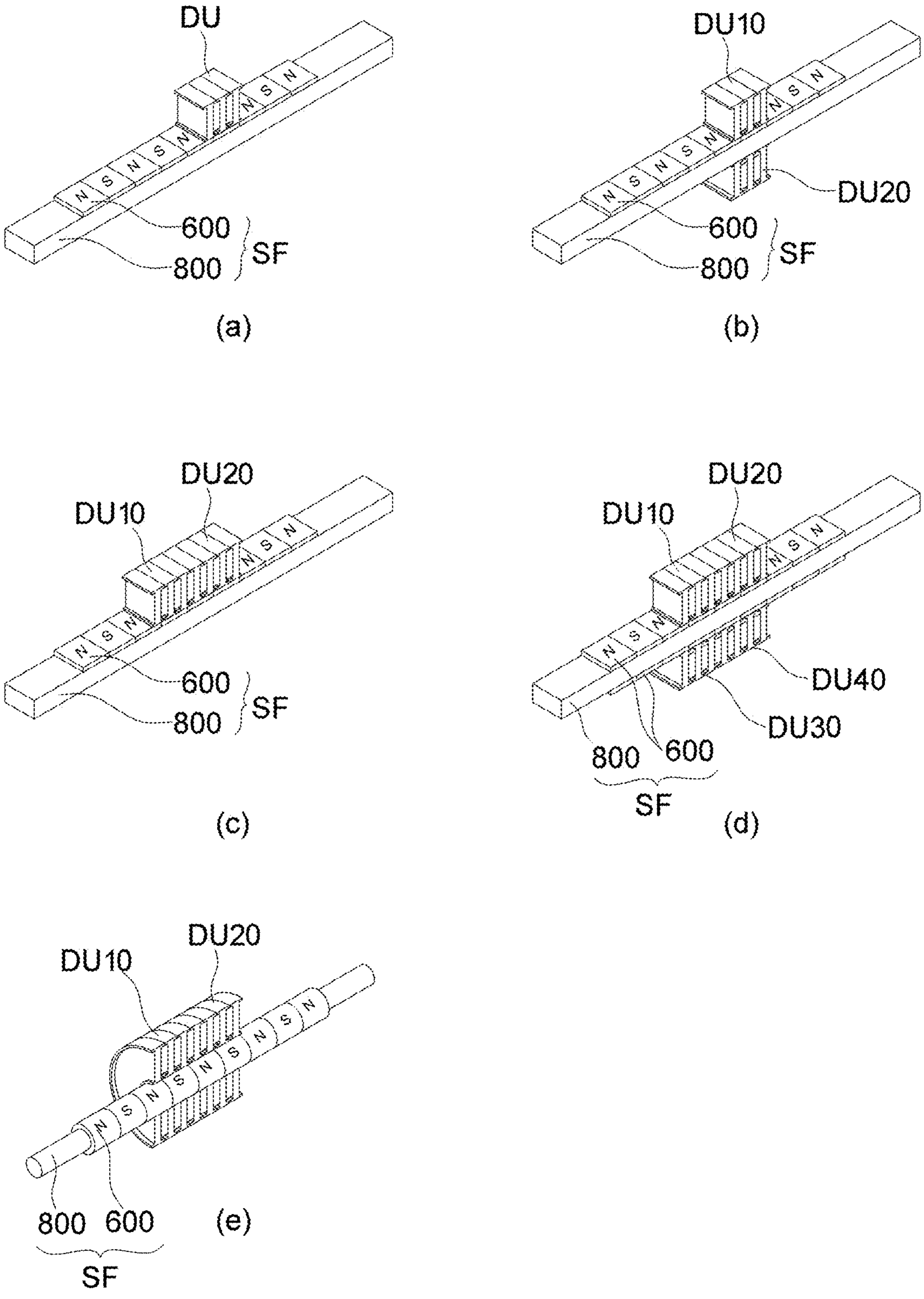
FIG. 8 shows diagrams illustrating various structures of a shaft and a driving unit of a linear motor according to an example embodiment.

FIG. 8 is a diagram illustrating various structures of a shaft and a driving unit of a linear motor according to an example embodiment.

As shown in FIG. 8, each linear motor may include a driving unit (e.g., at least one of DU, DU10, DU20, DU30, and DU40) and a shaft SF.

The driving unit (e.g., at least one of DU, DU10, DU20, DU30, and DU40) may perform a function of an armature (or a stator). The driving unit (e.g., at least one of DU, DU10, DU20, DU30, and DU40) may include, for example, a plurality of magnetic pole teeth and a coil wound around each of the magnetic pole teeth. The driving unit (e.g., at least one of DU, DU10, DU20, DU30, and DU40) may generate magnetic flux by applying a three-phase alternating current to the coil according to a steering control signal from the electronic control unit. Here, each driving unit (e.g., at least one of DU, DU10, DU20, DU30, and DU40) may include a three-phase coil.

The shaft SF may perform a function of a mover. The shaft SF may include a yoke 800 (or a back yoke) and a plurality of permanent magnets 600 disposed on the yoke 800. The permanent magnets 600 may be disposed along a longitudinal direction (e.g., a Y-axis direction or a −Y-axis direction) of the yoke 800. In this case, the adjacent permanent magnets 600 may be disposed so that opposite polarities face each other. Meanwhile, each permanent magnet 600 may be in a state magnetized in a thickness direction of the permanent magnet 600. Here, since the permanent magnets 600 and the driving unit (e.g., at least one of DU, DU10, DU20, DU30, and DU40) are sequentially stacked on the shaft SF, the stacking direction may correspond to the thickness direction of the above-described permanent magnet 600. Alternatively, the direction perpendicular to the arrangement direction of the permanent magnets 600 may be the thickness direction of the above-described permanent magnets 600. Meanwhile, the permanent magnets 600 may be attached to and fixed to the yoke 800. Accordingly, the permanent magnets 600 and the yoke 800 may move together. For example, since the permanent magnets 600 may move in the Y-axis direction or the −Y-axis direction as described above by the magnetic flux generated from the driving unit (e.g., at least one of DU, DU10, DU20, DU30, and DU40), the yoke 800 attached (or, bonded) to the permanent magnets 600 may also move in the same direction as the permanent magnets 600.

In FIG. 8, the polarities of the permanent magnet 600 are indicated by N and S, respectively.

Meanwhile, a joint part (e.g., JT1) may be coupled to one end of the yoke 800 through the housing (e.g., HS1) described above.

As shown in (a) of FIG. 8, the driving unit DU may be disposed on the shaft SF.

In addition, as shown in (b) of FIG. 8, the two driving units DU10 and DU20 may be disposed to face each other with the shaft SF interposed therebetween (e.g., between the two driving units DU10 and DU20). According to the structure, since the permanent magnets 600 and the coil are disposed in two pairs, the output of the linear motor may be increased, and a dual structure may also be possible.

In addition, as shown in (c) of FIG. 8, the two driving units DU10 and DU20 may be disposed adjacently on the same surface of the shaft SF in the longitudinal direction (or the moving direction of the shaft SF, or the movable direction of the shaft SF) of the shaft SF.

In addition, as shown in (d) of FIG. 8, the two driving units DU10 and DU20 may be disposed adjacently on a first surface of the shaft SF in the longitudinal direction (or moving direction of the shaft SF, or the movable direction of the shaft SF) of the shaft SF, and the other two driving units DU30 and DU40 may be disposed adjacently on a second surface of the shaft SF in the longitudinal direction (or moving direction of the shaft SF, or the movable direction of the shaft SF) of the shaft SF. Here, the second surface may be a surface located opposite to the first surface. In this case, the two driving units DU30 and DU40 disposed on the second surface may be disposed to face the two driving units DU10 and DU20 disposed on the first surface with the shaft SF interposed therebetween (e.g., between the two driving units DU10 and DU20). Meanwhile, the permanent magnets 600 may be disposed to face each other with the yoke 800 interposed therebetween (e.g., between the permanent magnets 600). In this case, permanent magnets facing each other with the yoke therebetween (e.g., between the permanent magnets 600) may have the same polarity. For example, the N pole of the permanent magnet 600 disposed on the upper surface of the yoke 800 and the N pole of the permanent magnet 600 disposed on the lower surface of the yoke 800 may face each other, and the S pole of the permanent magnet 600 disposed on the upper surface of the yoke 800 and the S pole of the permanent magnet 600 disposed on the lower surface of the yoke 800 may face each other.

Also, as shown in (e) of FIG. 8, the two driving units DU10 and DU20 may have a shape surrounding the outer circumferential surface of the shaft SF. At this time, the yoke 800 may have a cylindrical shape, the permanent magnets 600 may have a ring shape surrounding the outer circumferential surface of the yoke 800, and the two driving units DU10 and DU20 may have a ring shape surrounding the outer circumferential surface of the permanent magnets 600.

On the other hand, as shown in (a) to (d) of FIG. 8 described above, the yoke 800 and each driving unit (e.g., at least one of DU, DU10, DU20, DU30, and DU40) may have a rectangular shape.

Meanwhile, the number of driving units disposed on one shaft SF is not limited. For example, the number of driving units disposed on at least one surface of one shaft SF may be more or less than two.

In addition, the shape of the shaft, the permanent magnets 600 and the driving unit (e.g., at least one of DU, DU10, DU20, DU30, and DU40) is not limited to the above-described circular and rectangular, and may have a different shape.

According to the structure of (b) and (d) of FIG. 8 described above, since the permanent magnets 600 and the coil are disposed in two pairs, the output of the linear motor may be increased, and a dual structure may also be possible.

In addition, according to the structures of (c), (d) and (e) of FIG. 8 described above, since two or more three-phase coils are arranged, the output of the linear motor may be increased, and a dual structure may also be possible.

Figure 9:
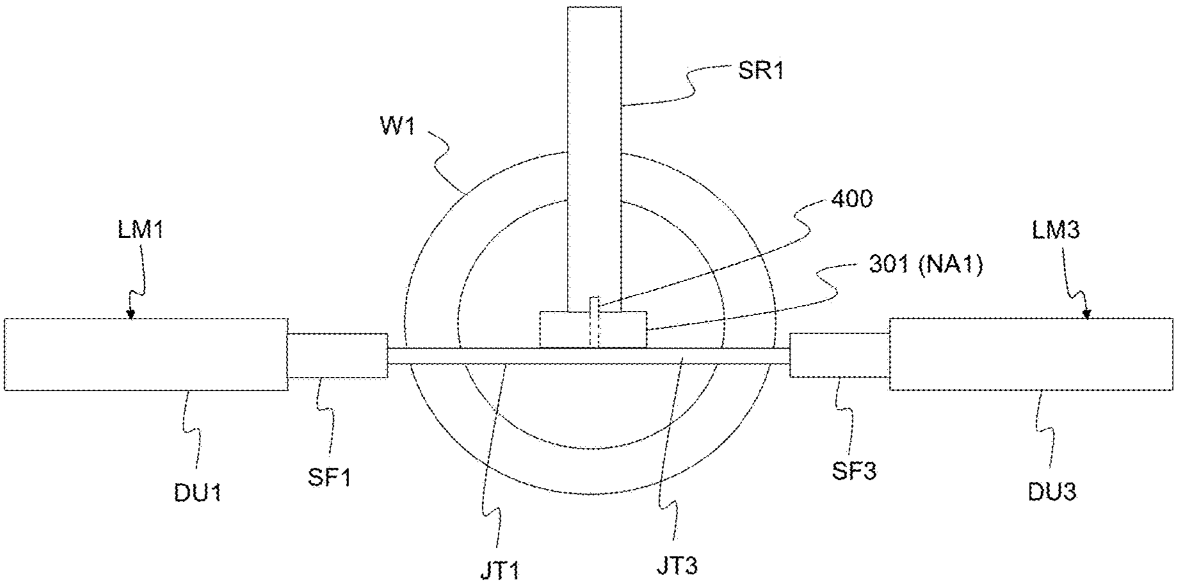
FIG. 9 is a diagram for illustrating a coupling position of a first coupling part of FIG. 6.

FIG. 9 is a diagram for illustrating a coupling position of the first coupling part 301 of FIG. 6.

The first coupling part 301 may be coupled to the lower side of the first strut SR1 to overlap the first wheel W1 as in the example shown in FIG. 9. In this case, the first linear motor LM1 and the second linear motor LM2 coupled to the first knuckle arm NA1 of the first coupling part 301 may be disposed on the lower side of the first strut SR1.

The second coupling part 302 may also be coupled to the lower side of the second strut SR2 to overlap the second wheel W2. In this case, the third linear motor LM3 and the fourth linear motor LM4 coupled to the second knuckle arm NA2 of the second coupling part 302 may be disposed on the lower side of the second strut SR2.

Meanwhile, as in the example shown in FIG. 9, the first coupling part 301 of FIG. 1 may also be disposed on the lower side of the first strut SR1 to overlap the first wheel W1. In this case, the first linear motor LM1 coupled to the first knuckle arm NA1 of the first coupling part 301 may be disposed on the lower side of the first strut SR1. In the same manner, the second coupling part 302 of FIG. 1 may also be disposed on the lower side of the second strut SR2 to overlap the second wheel W2, as in the example shown in FIG. 9. In this case, the third linear motor LM3 coupled to the second knuckle arm NA2 of the second coupling part 302 may be disposed on the lower side of the second strut SR2.

Figure 10:
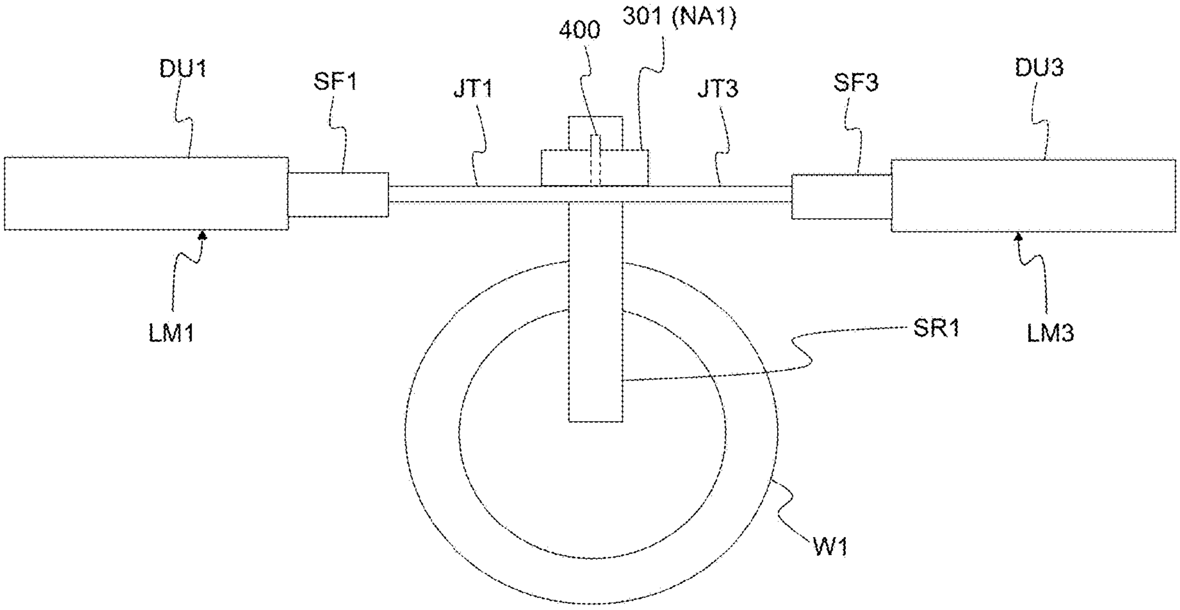
FIG. 10 is a diagram for illustrating another coupling position of the first coupling part of FIG. 6.

FIG. 10 is a diagram for illustrating another coupling position of the first coupling part 301 of FIG. 6.

The first coupling part 301 may be coupled to the upper side of the first strut SR1 to be positioned higher than the first wheel W1 from the ground, as in the example shown in FIG. 10. Since the upper side (or upper end) of the first strut SR1 does not overlap the first wheel W1, the first coupling part 301 coupled to the upper side of the first strut SR1 does not overlap the first wheel W1. In this case, the first linear motor LM1 and the second linear motor LM2 coupled to the first knuckle arm NA1 of the first coupling part 301 may be disposed on the upper side of the first strut SR1.

The second coupling part 302 may also be coupled to the upper side of the second strut SR2 to be positioned higher than the second wheel W2 from the ground. Since the upper side (or upper end) of the second strut SR2 does not overlap the second wheel W2, the second coupling part 302 coupled to the upper side of the second strut SR2 does not overlap the second wheel W2. In this case, the third linear motor LM3 and the fourth linear motor LM4 coupled to the second knuckle arm NA2 of the second coupling part 302 may be disposed on the upper side of the second strut SR2.

Meanwhile, as in the example shown in FIG. 10, the first coupling part 301 may also be coupled to the upper side of the first strut SR1 to be positioned higher than the first wheel W1. Since the upper side (or upper end) of the first strut SR1 does not overlap the first wheel W1, the first coupling part 301 coupled to the upper side of the first strut SR1 may not overlap the first wheel W1. In this case, the first linear motor LM1 coupled to the first knuckle arm NA1 of the first coupling part 301 may be disposed on the upper side of the first strut SR1. In the same manner, the second coupling part 302 may also be coupled to the upper side of the second strut SR2 to be positioned higher than the second wheel W2, as in the example shown in FIG. 10. Since the upper side (or upper end) of the second strut SR2 does not overlap the second wheel W2, the second coupling part 302 coupled to the upper side of the second strut SR2 may not overlap the second wheel W2. In this case, the third linear motor LM3 coupled to the second knuckle arm NA2 of the second coupling part 302 may be disposed on the upper side of the second strut SR2.

Meanwhile, the first knuckle arm NA1 of the first coupling part 301 may be coupled between the lower side and the upper side of the first strut SR1 (e.g., the central part). Similarly, the second knuckle arm NA2 of the second coupling part 302 may be coupled between the lower side and the upper side of the second strut SR2 (e.g., the central part).

Figure 11:
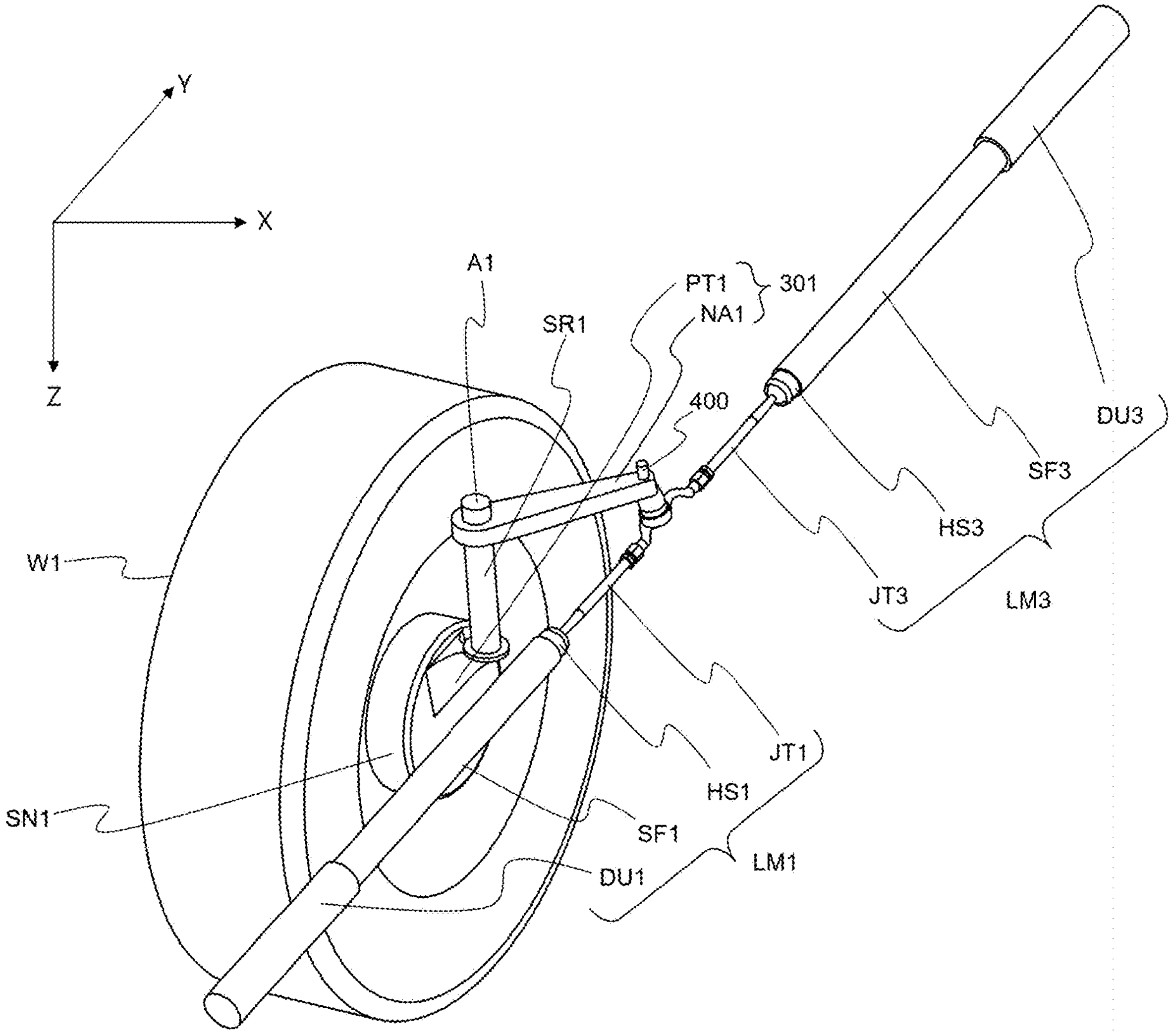
FIG. 11 is a diagram for illustrating another coupling position of the first coupling part of FIG. 6.

As in the structure of FIG. 9 and FIG. 11, the space for the vehicle's battery and the indoor legroom may be secured by appropriately adjusting the height of the knuckle arm of the coupling part and disposing the knuckle arm of the coupling part according to the structure (or state) of the vehicle.

FIG. 11 is a diagram for illustrating another coupling position of the first coupling part 301 of FIG. 6.

Since the first coupling part 301 may include the first protrusion PT1 and the first knuckle arm NA1 as described above, the first protrusion PT1 of the first coupling part 301 may be disposed on the lower side of the first strut SR1 to overlap the first wheel W1 as shown in FIG. 11. On the other hand, the first knuckle arm NA1 of the first coupling part 301 may be disposed on the upper side of the first strut SR1 not to overlap the first wheel W1. In other words, as in the example shown in FIG. 10, the first knuckle arm NA1 may be positioned higher than the first wheel W1.

Meanwhile, the first knuckle arm NA1 may include a hole through which the first strut SR1 passes. At this time, since the first knuckle arm NA1 is fixed to the first strut SR1, the first knuckle arm NA1 coupled to the first strut SR1 does not rotate with respect to the first strut SR1.

The second coupling part 302 may also have the same structure as the first coupling part 301 of FIG. 11. For example, the second protrusion PT2 of the second coupling part 302 may be disposed on the lower side of the second strut SR2 to overlap the second wheel W2. On the other hand, the second knuckle arm NA2 of the second coupling part 302 may be disposed on the upper side of the second strut SR2 not to overlap the second wheel W2. In other words, as in the example shown in FIG. 10, the second knuckle arm NA2 may be positioned higher than the first wheel W1.

Meanwhile, the second knuckle arm NA2 may include a hole through which the second strut SR2 passes. At this time, since the second knuckle arm NA2 is fixed to the second strut SR2, the second knuckle arm NA2 coupled to the second strut SR2 does not rotate with respect to the second strut SR2.

Figure 12:
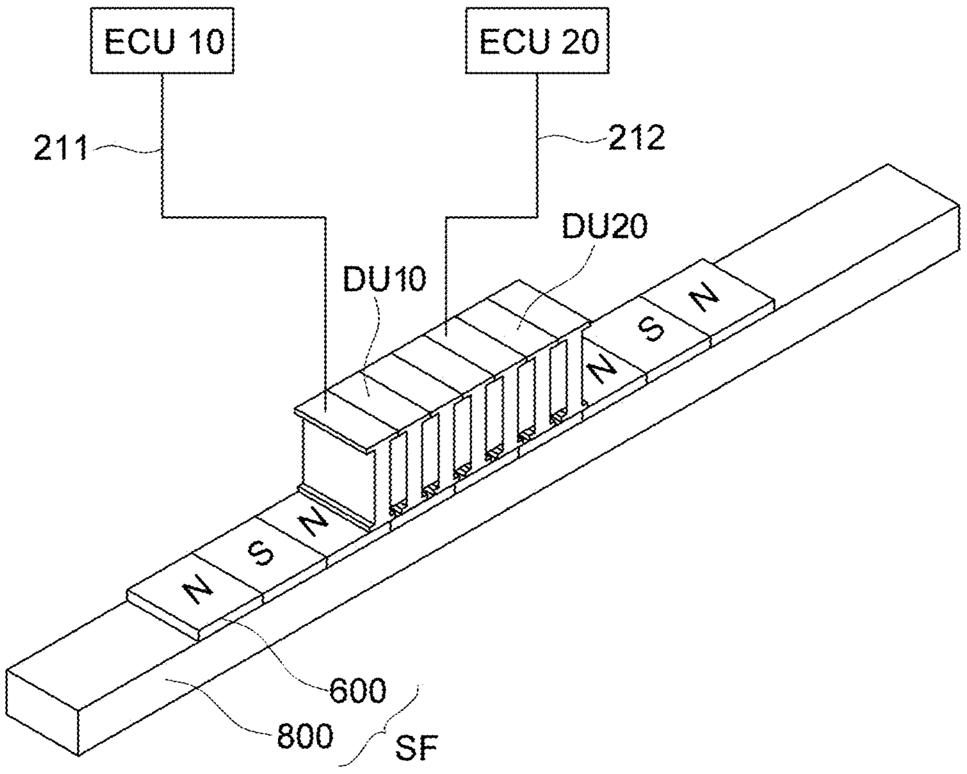
FIG. 12 is a diagram for illustrating an operation of a linear motor according to an example embodiment.

FIG. 12 is a diagram for illustrating an operation of a linear motor according to an example embodiment.

As shown in FIG. 12, one linear motor may include a plurality of driving units, for example, the first driving unit DU10 and the second driving unit DU20.

Since the linear motor of FIG. 12 is the same as the linear motor shown in (c) of FIG. 8 described above, the description of the linear motor of FIG. 12 refers to the description of the linear motor shown in (c) of FIG. 8.

The first driving unit DU10 may generate magnetic flux by applying a three-phase alternating current to the coil of the first driving unit DU10 according to a steering control signal from the first electronic control unit ECU10. In this case, since the first electronic control unit ECU10 and the first driving unit DU10 may be connected by a first wire 211, the steering control signal from the first electronic control unit ECU10 may be provided to the first driving unit DU10 through the first wire 211.

The second driving unit DU20 may generate a magnetic flux by applying a three-phase alternating current to the coil of the second driving unit DU20 according to a steering control signal from the second electronic control unit ECU20. In this case, since the second electronic control unit ECU20 and the second driving unit DU20 may be connected by a second wire 212, the steering control signal from the second electronic control unit ECU20 may be provided to the second driving unit DU20 through the second wire 212.

As such, one linear motor may have a dual structure including at least two driving units driven independently of each other. Accordingly, when an abnormality occurs in at least one of any one driving unit and the electronic control unit connected to the driving unit, it may be possible to normally drive the linear motor through the other driving unit and the other electronic control unit. For example, when the abnormality occurs in at least one of the first driving unit DU10 and the first electronic control unit ECU10, magnetic flux may be not generated and the shaft may not move. In this case, the shaft may be normally moved by the magnetic flux from the second driving unit DU20 by providing the steering control signal from the second electronic control unit ECU20 to the second driving unit DU20.

Figure 13:
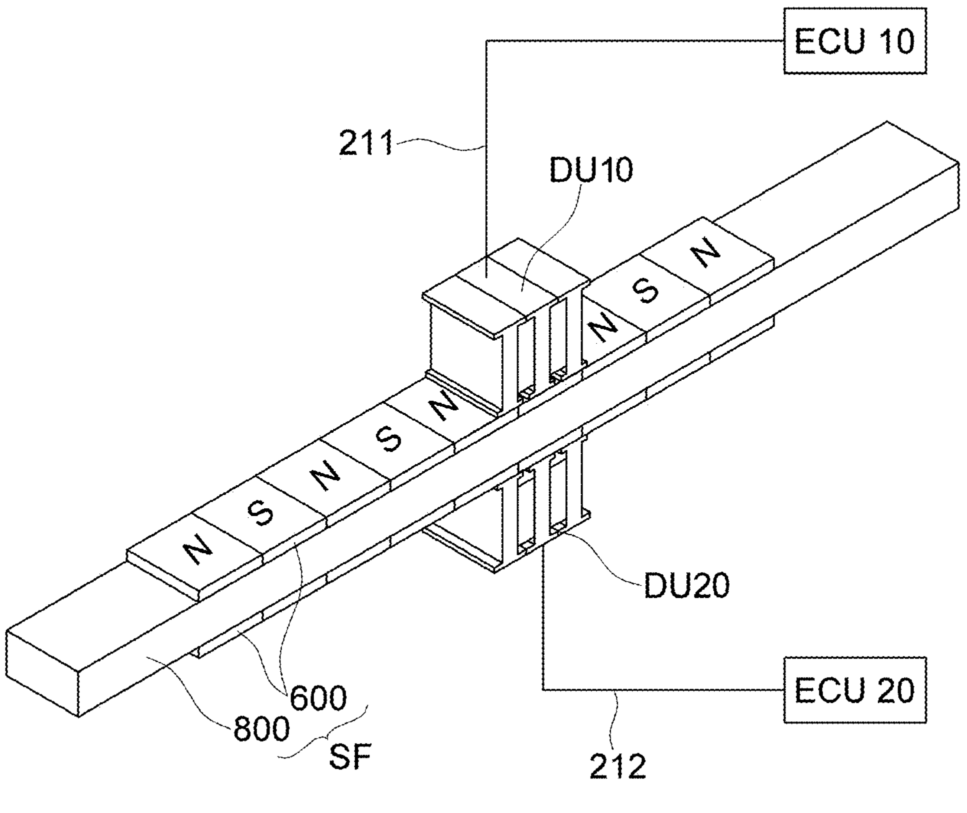
FIG. 13 is a diagram for illustrating an operation of a linear motor according to another example embodiment.

FIG. 13 is a diagram for illustrating an operation of a linear motor according to another example embodiment.

As shown in FIG. 13, one linear motor may include a plurality of driving units, for example, the first driving unit DU10 and the second driving unit DU20.

Since the linear motor of FIG. 13 is the same as the linear motor shown in (b) of FIG. 8, the description of the linear motor of FIG. 13 refers to the description of the linear motor shown in (b) of FIG. 8.

In addition, since the operations of the first driving unit DU10 and the second driving unit DU20 of FIG. 13 are the same as the above-described operations of the first driving unit DU10 and the second driving unit DU20 of FIG. 12, respectively, the description of the operations of the first driving unit DU10 and the second driving unit DU20 refers to the above-described operations of the first driving unit DU10 and the second driving unit DU20 of FIG. 12.

Figure 14:
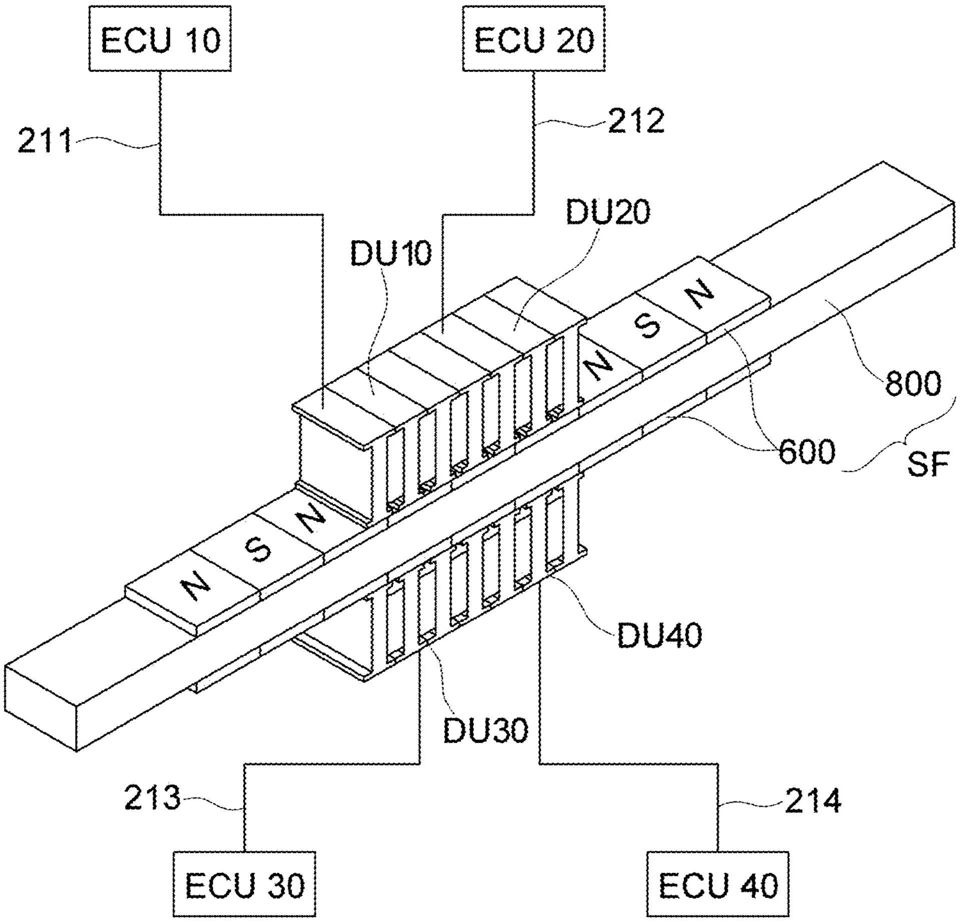
FIG. 14 is a diagram for illustrating an operation of a linear motor according to another example embodiment.

FIG. 14 is a diagram for illustrating an operation of a linear motor according to another example embodiment.

As shown in FIG. 14, one linear motor may include a plurality of driving units, for example, the first driving unit DU10, the second driving unit DU20, the third driving unit DU30, and the fourth driving unit DU40.

Since the linear motor of FIG. 14 is the same as the linear motor shown in (d) of FIG. 8, the description of the linear motor of FIG. 14 refers to the description of the linear motor shown in (d) of FIG. 8.

In addition, since the first driving unit DU10, the second driving unit DU20, the first electronic control unit ECU10 and the second electronic control unit ECU20 of FIG. 14 are the same as the first driving unit DU10, the second driving unit DU20, the first electronic control unit ECU10, and the second electronic control unit ECU20 of FIG. 12, the description of the first driving unit DU10, the second driving unit DU20, the first electronic control unit ECU10 and the second electronic control unit ECU 20 refers to the description of the first driving unit DU10, the second driving unit DU20, the first electronic control unit ECU10, and the second electronic control unit ECU20 of FIG. 12 described above.

The third driving unit DU30 may generate magnetic flux by applying a three-phase alternating current to the coil of the third driving unit DU30 according to a steering control signal from the third electronic control unit ECU30. At this time, since the third electronic control unit ECU30 and the third driving unit DU30 may be connected to each other by a third wire 213, a steering control signal from the third electronic control unit ECU30 may be provided to the third driving unit DU30 through the third wire 213.

The fourth driving unit DU40 may generate magnetic flux by applying a three-phase alternating current to the coil of the fourth driving unit DU40 according to a steering control signal from the fourth electronic control unit ECU40. At this time, since the fourth electronic control unit ECU40 and the fourth driving unit DU40 may be connected by a fourth wire 214, steering control signal from the fourth electronic control unit ECU40 may be provided to the fourth driving unit DU40 through the fourth wire 214.

The linear motor of FIG. 14 is an example embodiment of a dual structure including four driving units driven independently of each other.

Those skilled in the art to which this specification pertains will be able to understand that the present specification may be embodied in other specific forms without changing the technical spirit or essential features thereof. Therefore, it should be understood that the example embodiments described above are illustrative in all respects and not restrictive. The scope of the present specification is represented by the claims described later rather than the detailed description, and it should be interpreted that all changes or modifications derived from the meaning, scope and equivalent concepts of the claims are included in the scope of the present specification.

On the other hand, preferred example embodiments of the present specification have been disclosed in the present specification and drawings, and although specific terms are used, these are only used in a general sense to easily explain the technical content of the present specification and help the understanding of the invention, it is not intended to limit the scope of the specification. It will be apparent to those skilled in the art to which this specification pertains that other modifications based on the technical spirit of the present specification may be implemented in addition to the example embodiments disclosed herein.

What is claimed is:

1. A steering control device comprising:
a coupling part extending from a wheel;
a first linear motor coupled to the coupling part; and
a second linear motor coupled to the coupling part,
wherein the first linear motor comprises:
a first shaft which is movable; and
a first joint part having one side rotatably coupled to the first shaft and another side rotatably coupled to the coupling part,
wherein the second linear motor comprises:
a second shaft which is movable; and
a second joint part having one side rotatably coupled to the second shaft and another side rotatably coupled to the coupling part,
wherein the first joint part and the second joint part are rotatably coupled to the coupling part via one common coupling shaft, and
wherein the first shaft and the second shaft are disposed opposite to each other with respect to the common coupling shaft.

2. The steering control device of claim 1, wherein the coupling part comprises:
a protrusion attached to a steering knuckle of the wheel; and
a knuckle arm protruding from the protrusion and rotatably coupled to the first joint part and the second joint part through the common coupling shaft.

3. The steering control device of claim 1, wherein the first linear motor further comprises at least one driving unit configured to drive the first shaft.

4. The steering control device of claim 3, wherein the at least one driving unit comprises a coil.

5. The steering control device of claim 1, wherein the first shaft comprises:
a yoke having one side rotatably connected to the first joint part; and
a permanent magnet disposed on the yoke.

6. The steering control device of claim 5, wherein the permanent magnet is disposed on at least one of one surface and another surface of the yoke.

7. The steering control device of claim 1, wherein the permanent magnet surrounds the yoke.

8. The steering control device of claim 3, further comprising at least one control unit configured to control the at least one driving unit of the first linear motor.

9. The steering control device of claim 3, wherein the at least one driving unit is disposed on one surface of the first shaft.

10. The steering control device of claim 3, wherein the at least one driving unit comprises a plurality of driving units, and the plurality of driving units are disposed on one surface and another surface of the first shaft, respectively, to face each other with the first shaft disposed between the plurality of driving units.

11. The steering control device of claim 8, wherein the at least one control unit and the at least one driving unit of the first linear motor are connected through a wire.

12. The steering control device of claim 2, further comprising a strut coupled to a groove of the protrusion.

13. The steering control device of claim 12, wherein the protrusion is coupled to a lower side of the strut to overlap the wheel.

14. The steering control device of claim 12, wherein the knuckle arm is coupled to an upper side of the strut to be positioned higher than the wheel.

15. The steering control device of claim 12, wherein the protrusion of the coupling part is coupled to a lower side of the strut to overlap the wheel, and
the knuckle arm of the coupling part is coupled to an upper side of the strut to be positioned higher than the wheel such that the first linear motor and the second linear motor are positioned higher than the wheel.

16. The steering control device of claim 1, wherein the first linear motor and the second linear motor are configured to steer one single wheel, and
the first shaft and the second shaft are separate members that are separately movable.

17. The steering control device of claim 1, wherein the first shaft comprises:
a yoke having one side rotatably connected to the first joint part;
a plurality of first permanent magnets disposed on one surface of the yoke; and
a plurality of second permanent magnets disposed on another surface of the yoke opposite to the one surface,
wherein adjacent ones of the first permanent magnets have different polarities,
wherein adjacent ones of the second permanent magnets have different polarities,
wherein one of the first permanent magnets facing one of the second permanent magnets with the yoke therebetween have a same polarity,
wherein the first linear motor further comprises a driving unit configured to drive the first shaft and including a first driving unit and a second driving unit,
wherein the first driving unit is disposed to face the first permanent magnets,
wherein the second driving unit is disposed to face the second permanent magnets, and
the first driving unit and the second driving unit are separate members that are independently movable.

18. The steering control device of claim 1, wherein the common coupling shaft extends along a first direction,
the first shaft and the second shaft extend along a second direction that crosses the first direction, and
the first linear motor and the second linear motor are configured such that when one of the first shaft and the second shaft moves toward the common coupling shaft, the other of the first shaft and the second shaft moves away from the common coupling shaft.

19. The steering control device of claim 2, wherein an end portion of the first joint part overlaps an end portion of the second joint part in a direction along which the common coupling shaft extends, and
the common coupling shaft passes through the end portion of the first joint part and the end portion of the second joint part so as to be rotatably coupled to the knuckle arm.

20. The steering control device of claim 2, wherein the common coupling shaft extends from an end portion of the first joint part and passes through an end portion of the second joint part so as to be rotatably coupled to the knuckle arm.

* * * * *